United States Patent
Gonzalez et al.

(10) Patent No.: US 9,456,709 B2
(45) Date of Patent: Oct. 4, 2016

(54) INSULATED CUP

(71) Applicants: Rafael Rosas Gonzalez, San Diego, CA (US); Elias Ortiz, San Diego, CA (US)

(72) Inventors: Rafael Rosas Gonzalez, San Diego, CA (US); Elias Ortiz, San Diego, CA (US)

(*) Notice: Subject to any disclaimer, the term of this patent is extended or adjusted under 35 U.S.C. 154(b) by 87 days.

(21) Appl. No.: 14/487,417

(22) Filed: Sep. 16, 2014

(65) Prior Publication Data

US 2015/0083791 A1 Mar. 26, 2015

Related U.S. Application Data

(63) Continuation-in-part of application No. 29/462,520, filed on Aug. 5, 2013, now Pat. No. Des. 718,577.

(60) Provisional application No. 61/878,519, filed on Sep. 16, 2013.

(51) Int. Cl.
*B65D 3/28* (2006.01)
*B65D 81/38* (2006.01)
*A47G 19/22* (2006.01)
*B65D 3/06* (2006.01)

(52) U.S. Cl.
CPC ....... *A47G 19/2205* (2013.01); *A47G 19/2288* (2013.01); *B65D 3/06* (2013.01); *B65D 81/3874* (2013.01); *Y02W 90/13* (2015.05); *Y10T 29/49826* (2015.01)

(58) Field of Classification Search
CPC ............... A47G 19/2205; A47G 19/2288; B65D 3/22; B65D 3/28; B65D 81/3865; B65D 81/3874
USPC ............... 229/403; 220/669, 670, 671, 672
See application file for complete search history.

(56) References Cited

U.S. PATENT DOCUMENTS

| | | | | |
|---|---|---|---|---|
| 5,415,339 A | * | 5/1995 | Howard | B65D 3/28 220/671 |
| 6,852,381 B2 | * | 2/2005 | Debraal | B29C 47/0021 220/592.16 |
| 2001/0050287 A1 | * | 12/2001 | Namba | B65D 1/265 220/592.17 |
| 2003/0226882 A1 | * | 12/2003 | Porchia | B65D 3/22 229/403 |
| 2006/0027640 A1 | * | 2/2006 | Smith | B65D 3/06 229/400 |

* cited by examiner

*Primary Examiner* — Gary Elkins
(74) *Attorney, Agent, or Firm* — Buche & Associates, P.C.; John K. Buche; Bryce A. Johnson

(57) ABSTRACT

The use of embossed paper material allows for inexpensive production of a re-useable, recyclable, and consumer safe hot beverage container. The beverage container may consist of a bio-degradable polymer coating on the inside lining of the cup, and a petrol based chemical coating on the outside of the cup. In a preferred embodiment, the use of embossed paper material allows for inexpensive production of a re-useable, recyclable, and consumer safe hot beverage container.

1 Claim, 4 Drawing Sheets

INSULATED CUP

CROSS-REFERENCE TO RELATED APPLICATIONS

This application claims priority to U.S. Provisional Pat. App. No. 61/878,519 filed on Sep. 16, 2013. This application is also a continuation-in-part of U.S. Des. patent application Ser. No. 29/462,520 (filed Aug. 5, 2013). The previously filed applications are hereby incorporated by reference in their entirety.

STATEMENT REGARDING FEDERALLY SPONSORED RESEARCH OR DEVELOPMENT

Not applicable.

BACKGROUND OF THE INVENTION

1. Field of Invention

The disclosed subject matter is in the field of insulated drinking cups.

2. Background of the Invention

Hot beverages sometimes require insulated containers in order for people to hold the container without experiencing discomfort due to a temperature gradient across the container wall. Non-insulated containers allow heat to conduct through the material of the container and allow the outside of the container to get hot while the contents of the container lose heat. Insulated containers exist that are capable of achieving a proper level of insulation, but such known containers are expensive or difficult to manufacture, difficult to stack, inefficient in reducing heat loss, waste construction materials, or possibly present a danger for consumers. The predominant means of drinking hot beverages in a container is to provide an outer sleeve that does not conduct heat from the main container to the outside of the sleeve. Another predominant method is to provide a cup composed of foam or plastic that keeps the outside cool enough to hold. Both means are costly or inefficient. Adding a sleeve onto a paper cup involves a two-step process involving two components resulting in large inefficiencies. A foam or plastic cup, which eliminates the sleeve, is expensive to manufacture and may also release chemical substances when heated at high temperatures. Thus, a need exists for safe insulated containers that are inexpensive to manufacture, efficient in reducing heat loss, not wasteful of construction materials.

SUMMARY OF THE INVENTION

In view of the foregoing, it is an object of the present invention to provide an inexpensive, insulated beverage cup that may be easily stacked for mass storage. In a preferred embodiment, the container is constructed of embossed paper material, which is inexpensive, re-useable, recyclable, and consumer safe. The embossed paper material further results in optimal insulation and may feature at least one taper to facilitate heat exchange or stacking. Not only does the outside of the container remain at a temperature level comfortable for use, the liquid inside the container stays at optimum temperature level.

In a preferred embodiment, the disclosed beverage cup is composed of corrugated fiberboard. The corrugated fiberboard is a paper-based material consisting of a fluted sheet and one or two linerboards. The corrugated, multi-layered construction makes it strong enough to withstand prolonged handling. The disclosed cup's design allows it to be made of thinner paper and, as a result, makes very efficient use of paper stock consumes a minimal amount of natural resources. In one mode of construction, the beverage is constructed of two or three layers that are folded or wound in a single sheet of paper, in a single wrapping operation. That is to say, the disclosed beverage container can be easily and inexpensively manufactured with existing machinery. Unlike conventional corrugated boxboard, the layers of the disclosed beverage container may be folded without being permanently or fixedly adhered to one another. Instead, the disclosed beverage container may be wrapped into a cylindrical shape prior to sealing.

The shell may be coated on the inside with a plant based material, a biodegradable material, a wax, or plastic. The shell may be layered on the outside with a petrochemical based liner. Some advantages of layering the outside with a petrochemical based material may include diminishing condensation on the outside surface and diminishing heat transfer to the outside. The outside of the shell may have a printed design. Some embodiments will provide a printed design featuring a company logo or insignia. Further, some embodiments will provide an embossed or etched design featuring a company logo or insignia. The embossed or etched design may be in solid or broken lines. The crest of the embossed design may have an extra substrate attached to it.

In some embodiments, the volume of the cup ranges from 5 ounces to 15 ounces. In other embodiments, the volume of the cup is about 9 ounces.

Other advantages of the disclosed beverage container include biodegradability. In a preferred embodiment, the disclosed beverage container is composed of wood pulp which is 100% biodegradable. In a preferred embodiment, the beverage container consists of a bio-degradable polymer coating on the inside lining of the cup, and a petrol based chemical coating on the outside of the cup.

BRIEF DESCRIPTION OF THE FIGURES

Other objectives of the invention will become apparent to those skilled in the art once the preferred embodiment of the invention has been shown and described. The manner in which these objectives and other desirable characteristics can be obtained is explained in the following description and attached figures in which.

It is to be noted, however, that the appended figures illustrate only typical embodiments of the disclosed apparatus and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFFERED EMBODIMENTS

Figure 1:
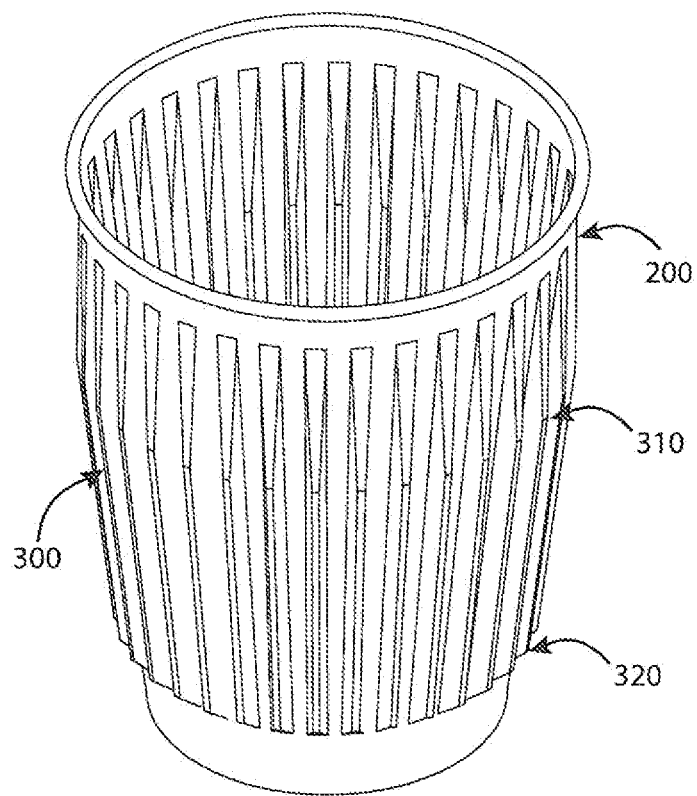
FIG. 1 is a perspective view of the insulated cup.

FIG. 1 depicts a preferred embodiment of the disclosed insulated beverage container. The figure depicts an environmental view of the beverage container in the assembled form. As shown the beverage features a shell 200 that may be composed of a 100% recyclable paper based material. For instance, the shell 200 may be composed of cardboard, high density paper, corrugated paperboard, or other variants. In some embodiments, the outer shell 200 is cylindrical and features tapered fins 300. The tapered fins 300 of the shell 200 may feature a bi-directional taper that facilitates stacking or heat-exchange. Additionally, the tapered fins 300 may form an obtuse triangle to facilitate such means. In such an embodiment, the top of the fin tapers outwardly away from the cup down towards the edge 310, and then tapers along the plane of the cup down to the edge 320.

In some embodiments, the shell 200 is constructed of single-wall corrugate paperboard, double-wall corrugate paperboard, or triple-wall corrugate paperboard. In embodiments composed of corrugate paperboard, the fluting medium of the corrugated paperboard may be A grade, B grade, C grade, or E grade, as known in the art. A grade fluting medium can withstand 20-25 kilograms ("kg") of force. B grade fluting medium can withstand 10-12 kg of force. C grade fluting medium can withstand 5-8 kg of force. E grade fluting medium can withstand 1-2 kg of force.

The shell 200 may suitably be coated on the inside with a plant based material, a biodegradable material, a wax, or plastic. The shell 200 may be layered on the outside with a petrochemical based liner. Some advantages of layering the outside with a petrochemical based material may include diminishing condensation on the outside surface, increasing structural strength against liquid, and diminishing heat transfer to the outside. The outside of the shell 200 may have a printed design. Some embodiments will provide a printed design featuring a company logo or insignia. Further, some embodiments will provide an embossed or etched design featuring a company logo or insignia. The embossed or etched design may be in solid or broken lines. The crest of the embossed design may have an extra substrate attached to it for thermal insulation or additional resistance strength.

In some embodiments, the volume of the cup ranges from 5 ounces to 15 ounces. In other embodiments, the volume of the cup is about 9 ounces.

Figure 2:
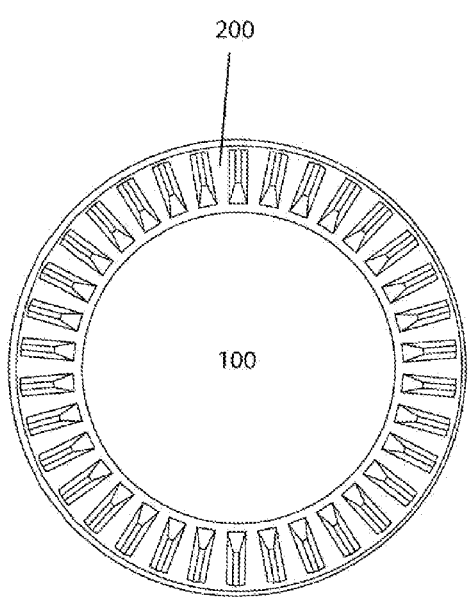
FIG. 2 is a top view of the insulated cup.
Figure 3:
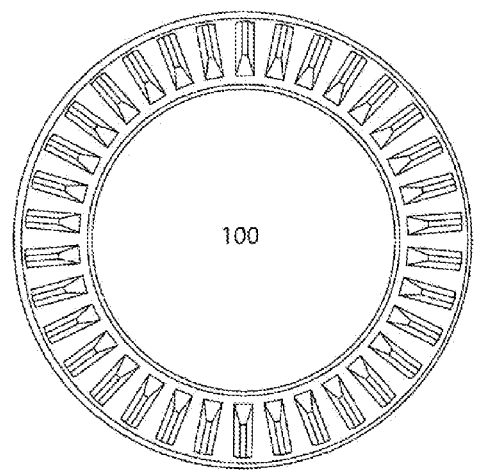
FIG. 3 is a bottom view of the insulated cup.

FIGS. 2 and 3 respectively depict a top view and a bottom view of the disclosed beverage container in the assembled form. As shown, the beverage container features a base 100 on the underside of the shell. In general, the base 100 is attached to the shell 200 by heat sealing the edge of the base 100 to the inner diameter of the shell 200. The assembly process is described further below in connection with the later figures.

Figure 4:
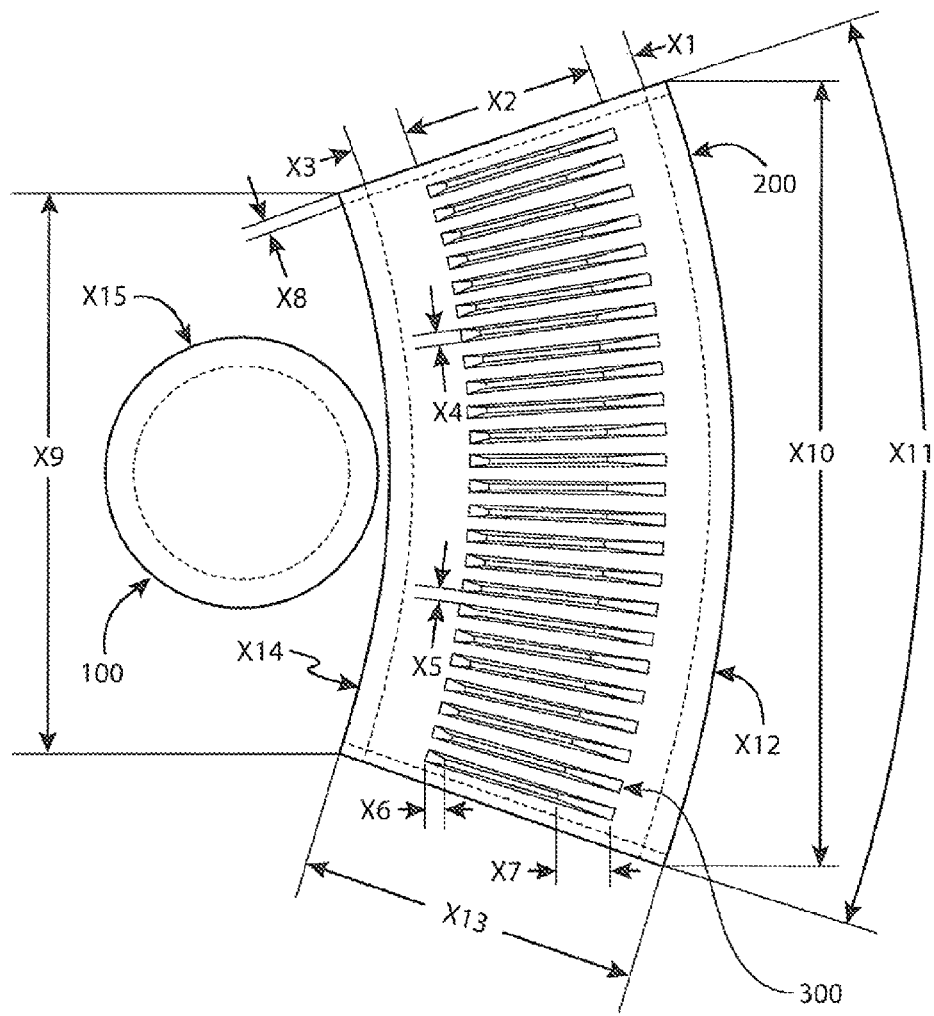
FIG. 4 is a top view of the insulated cup in unassembled form.

FIG. 4 depicts an isometric top view of an unassembled beverage container. More specifically, the figure depicts three elements of the disclosed beverage container: (1) the base 100, (2) the shell 200, and (3) fins 300. The base 100 may be die cut from unprinted paperboard stock. The shell 200 may define an arc cut from materials disclosed above. Preferably, the shell 200 may be rolled into a tapered cylinder as disclosed above in connection with FIGS. 1 through 3. For assembly, the base 100 may be pressed into the smaller diameter of the shell 200 and sealed in place with heat and pressure. To complete assembly of the beverage container, the upper edge of the shell 200, in cylindrical form, may be rolled into a lip as shown in FIG. 1.

Still referring to FIG. 4, the distance between the top of the fins 300 and the top of the shell 200 (represented by X1) may vary from about ⅛ inch to about 4 inches. X1 may be more than 4 inches depending on the height of the cup. The length of the fins (represented by X2) may vary from about 2.5 inches to about 3.5 inches. The distance between the bottom of the fins 300 and the bottom of the shell 200 (represented by X3) may vary from about ⅛ inch to about 1.5 inches. In some embodiments, X3 is about 1 inch. The distance of X3 may be important for comfortable holding of the cup. The width of the fins 300 (represented by X4) may vary from about 1/16 inch to about ½ inch. In some embodiments, X4 is about ⅛ inch. The distance between individual fins (represented by X5) may vary from 1/16 inch to about ½ inch. In some embodiments, X5 ranges from about 3/16 inch to about 5/16 inch. The length of the bottom chamfer of each individual fin (represented by X6) may vary from about 1/16 inch to about ½ inch. In some embodiments, X6 ranges from about ⅛ inch to about ¼ inch. The length of the top chamfer of each individual fin (represented by X7) may vary from about ⅛ inch to about 2 inches. In some embodiments, X7 ranges from about ¼ inch to about 1.5 inches. The fins may feature a bi-directional taper that form a point near the top of the cup.

Still referring to FIG. 4, the distance of the flange of the shell 200 (represented by X8) may vary from about 1/16 inch to about ½ inch. In some embodiments, X8 is about ⅛ inch. The bottom length of the shell 200 (represented by X9) may vary from about 5 inches to 8 inches. In some embodiments, X9 is about 6.5 inches. The top length of the shell 200 (represented by X10) may vary from about 8 inches to 11 inches. In some embodiments, X10 is about 9 inches. The angle measure of the arc at the top of the shell 200 (represented by X11) may vary from about 35° to about 40°. In some embodiments, X11 is about 37.63°. The radius of the top of the shell 200 (represented by X12) may vary from about 12 inches to about 15 inches. In some embodiments, X12 is about 13.7 inches. The height of the shell 200 (represented by X13) may vary from about 3 inches to 5 inches. In some embodiments, X13 is a bout 4 inches. The radius of the bottom of the shell 200 (represented by X14) may vary from about 8 inches to about 11 inches. In some embodiments, X14 is about 9.7 inches. The radius of the base 100 (represented by X15) may vary from about 1.5 inches to about 4 inches. In some embodiments, X15 is about 2 inches.

Figure 5:
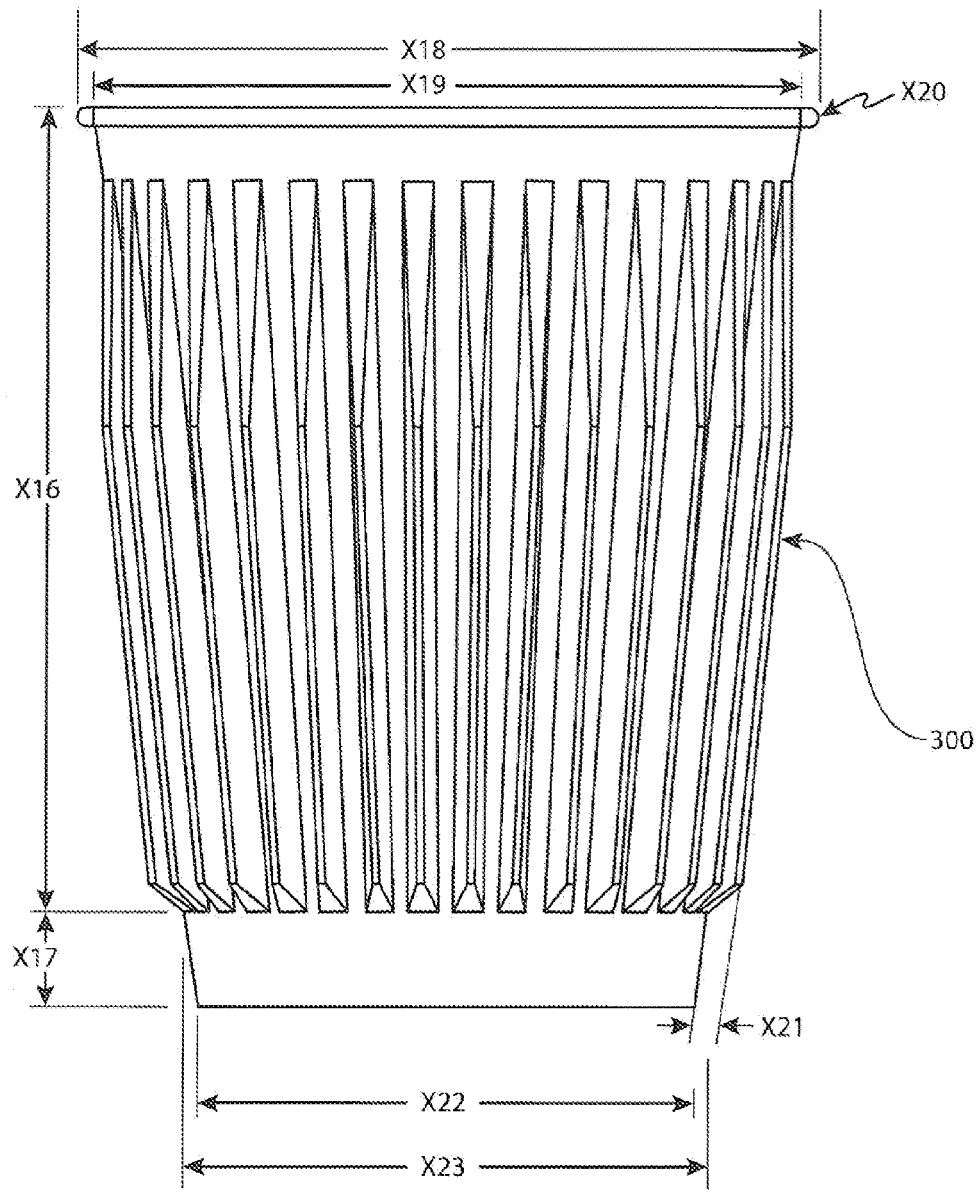
FIG. 5 is a front view of the insulated cup.

FIG. 5 depicts a front view of the disclosed beverage container or cup in an assembled form. The figure defines dimensions of an embodiment of the beverage container. The height of the cup from the top of the cup down to the bottom of the fins (represented by X15) may vary from 3 inches to 4 inches. In some embodiments, the X16 is about 3.3 inches. The distance from the bottom of the fins to the bottom of the cup (represented by X17) may vary from ⅛ inch to about 1.5 inches. In some embodiments, X17 is about 1 inch. The outer circumference of the top of the cup (represented by X18) may vary from about 2 inches to about 4 inches. In some embodiments, X18 is about 3 inches. The inner circumference of the top of the cup (represented by X19) may vary from 1.5 inches to about 3.8 inches. In some embodiments, X19 is about 2.8 inches. The radius of the outer lip of the top of the cup (represented by X20) may vary from about 0.03 inch to about 0.1 inch. In some embodiments, X20 is about 0.05 inches. The depth of each individual fin (represented by X21) may vary from about 1/32 inch to about 3/16 inch. In some embodiments, X21 ranges from 1/16 inch to 3/16 inch. The inner circumference of the bottom of the cup (represented by X22) may vary from about 1.5 inches to about 4 inches. In some embodiments, X22 is about 2 inches. The circumference of the cup at the bottom of the fins (represented by X23) may vary from about 1.6 inches to about 4.1 inches. In some embodiments. X23 is about 2.1 inches.

Still referring to FIG. 5, the fins 300 may be created by embossing the outer sleeve. The depth of the fins 300 due to the embossing may be ⅛ inch with a tolerance of 1/32 inch. The depth of the embossing may create separation from the inner surface of the cup to the outer surface of the cup. The depth of the embossing may play an important factor in ensuring optimal handling temperature on the outside of the cup.

We claim:
1. A cup comprising:
   a shell featuring an embossing producing a pattern of protruding fins;
   a base;
   secured attachment of the base to the shell;
   wherein both the shell and the base are composed of a paper based material;
   wherein the protruding fins feature a bi-directional taper down the outer surface of the cup;
   wherein the width of each of the protruding fins measures about ⅛ inch;
   wherein a gap is situated between each of the protruding fins and where the gap between the protruding fins measures from 3/16 inch to 5/16 inch;
   wherein the height of each of the protruding fins measures from 2.5 inches to 3.5 inches; and
   wherein the depth of each of the protruding fins measure from 1/16 inch to 3/16 inch.

* * * * *